United States Patent
Zeng et al.

(10) Patent No.: US 11,863,595 B2
(45) Date of Patent: Jan. 2, 2024

(54) METHOD AND APPARATUS FOR MATCHING USERS, COMPUTER DEVICE, AND STORAGE MEDIUM

(71) Applicant: TIYA PTE. LTD., Singapore (SG)

(72) Inventors: Minjie Zeng, Zhongshan (CN); Zelong Li, Guangzhou (CN)

(73) Assignee: TIYA PTE. LTD., Singapore (SG)

( * ) Notice: Subject to any disclaimer, the term of this patent is extended or adjusted under 35 U.S.C. 154(b) by 0 days.

(21) Appl. No.: 17/344,981

(22) Filed: Jun. 11, 2021

(65) Prior Publication Data

US 2022/0272130 A1 Aug. 25, 2022

(30) Foreign Application Priority Data

Feb. 19, 2021 (CN) .......................... 202110189537.7

(51) Int. Cl.
| | | |
|---|---|---|
| *G06F 15/16* | (2006.01) | |
| *H04L 65/1069* | (2022.01) | |
| *H04L 65/1083* | (2022.01) | |
| *H04L 67/306* | (2022.01) | |
| *G06Q 50/00* | (2012.01) | |

(52) U.S. Cl.
CPC ...... *H04L 65/1069* (2013.01); *H04L 65/1083* (2013.01); *H04L 67/306* (2013.01); *G06Q 50/01* (2013.01)

(58) Field of Classification Search
CPC .............. H04L 65/1069; H04L 65/1083; H04L 67/306; G06Q 50/01
See application file for complete search history.

(56) References Cited

U.S. PATENT DOCUMENTS

| | | | |
|---|---|---|---|
| 9,681,194 B2* | 6/2017 | Clayton | H04N 21/2543 |
| 10,204,307 B1* | 2/2019 | Dasgupta | G06N 20/00 |
| 10,210,269 B1* | 2/2019 | Kenthapadi | G06F 16/9535 |
| 10,320,734 B1* | 6/2019 | Mishra | H04L 51/214 |
| 10,554,698 B2* | 2/2020 | Ahn | H04L 65/1059 |
| 10,623,451 B2* | 4/2020 | Rathod | H04L 51/04 |
| 10,761,866 B2* | 9/2020 | Liu | G06F 16/3344 |
| 10,812,354 B2* | 10/2020 | Chan | H04L 43/065 |
| 10,834,119 B1* | 11/2020 | Casillas | H04L 63/1433 |
| 11,030,264 B2* | 6/2021 | Schoenberg | H04L 63/08 |

(Continued)

FOREIGN PATENT DOCUMENTS

| | | | | |
|---|---|---|---|---|
| CN | 104615775 A | | 5/2015 | |
| WO | WO-9741673 A2 * | | 11/1997 | G06Q 30/02 |
| WO | WO-2022090841 A1 * | | 5/2022 | |

*Primary Examiner* — Ario Etienne
*Assistant Examiner* — Thorne E Waugh
(74) *Attorney, Agent, or Firm* — Bayramoglu Law Offices LLC

(57) ABSTRACT

A method and apparatus for matching users, a computer device, and a storage medium are provided. The method includes: receiving a matching request sent by a first user; searching, in response to the matching request, second users adapted to the first user; selecting a second user of the second users as a target user according to the second link value to create a voice session with the first user; recording behavior data between the first user and the target user in the voice session; and updating a first link value and a second link value of the target user according to the behavior data and the second link value of the target user. The method and apparatus for matching users can greatly reduce cost and improve efficiency.

18 Claims, 8 Drawing Sheets

(56) References Cited

U.S. PATENT DOCUMENTS

| | | | |
|---|---|---|---|
| 11,276,127 B1* | 3/2022 | Stevens | G06N 3/084 |
| 11,308,169 B1* | 4/2022 | Koukoumidis | H04L 41/20 |
| 2006/0166740 A1* | 7/2006 | Sufuentes | A63F 13/795 |
| | | | 463/40 |
| 2012/0059922 A1* | 3/2012 | Jason | H04L 51/58 |
| | | | 709/223 |
| 2016/0253710 A1* | 9/2016 | Publicover | H04W 4/21 |
| | | | 705/14.66 |
| 2017/0111327 A1* | 4/2017 | Wu | G06Q 50/01 |
| 2017/0301038 A1* | 10/2017 | Mawji | G06Q 20/384 |
| 2018/0130139 A1* | 5/2018 | Hurley | G06Q 50/01 |
| 2019/0272361 A1* | 9/2019 | Kursun | H04L 67/535 |
| 2019/0325042 A1* | 10/2019 | Yu | G06F 16/24575 |
| 2020/0021545 A1* | 1/2020 | Xiao | H04L 51/04 |
| 2020/0134288 A1* | 4/2020 | Frolovichev | G06V 10/75 |
| 2021/0065314 A1* | 3/2021 | Storment | H04L 51/52 |
| 2021/0157462 A1* | 5/2021 | Hwang | G06F 3/0482 |
| 2021/0234748 A1* | 7/2021 | Frind | G06F 16/9535 |

* cited by examiner

METHOD AND APPARATUS FOR MATCHING USERS, COMPUTER DEVICE, AND STORAGE MEDIUM

CROSS REFERENCE TO THE RELATED APPLICATIONS

This application is based upon and claims priority to Chinese Patent Application No. 202110189537.7, filed on Feb. 19, 2021, the entire contents of which are incorporated herein by reference.

TECHNICAL FIELD

Embodiments of the present invention relate to the technical field of information processing, and more particularly to a method and apparatus for matching users, a computer device, and a storage medium.

BACKGROUND

In the scenarios of making anonymous friends, city friends and the like, users will be matched with other users who are not friends for temporary voice sessions. During the voice sessions, some users may have illegal behaviors such as voice harassment for other users, and the users who are harassed will feel uncomfortable.

To isolate different users and improve user experience in the voice sessions, the present review control risk solution mainly conducts manual review through operators. However, the voice between users is difficult to review, and a lot of operators are required for the manual review. As a result, the cost of the solution is often high, and the efficiency is relatively low.

In addition, in other review control risk solutions, users willingly report other users, and the other users are labeled and tracked. However, users are often used to cancel the match without reporting, resulting in low efficiency of these solutions.

SUMMARY

Embodiments of the present invention propose a method and apparatus for matching users, a computer device, and a storage medium to solve the problem of how to reduce cost and improve efficiency when isolating different users in a scenario of voice session.

In the first aspect, an embodiment of the present invention provides a method for matching users, including:
  receiving a matching request sent by a first user, wherein the first user has a first link value used to indicate a value of the first user in a voice session;
  searching, in response to the matching request, second users adapted to the first user, wherein each second user of the second users has a second link value used to indicate a value of the each second user in the voice session;
  selecting a second user of the second users as a target user according to the second link value to create a voice session with the first user;
  recording behavior data between the first user and the target user in the voice session; and
  updating the first link value and the second link value of the target user according to the behavior data and the second link value of the target user.

Optionally, the step of searching, in response to the matching request, the second users adapted to the first user includes:
  reading a matching condition set by the first user from the matching request; and
  searching users as the second users, wherein the users satisfy the matching condition.

Optionally, the step of selecting the second user as the target user according to the second link value to create the voice session with the first user includes:
  when the first user is a new user, selecting the second user as the target user to create the voice session with the first user, wherein the second link value of the second user is a median;
  or,
  when the first user is an old user, determining a first position of the first user and second positions of the second users respectively;
  selecting a plurality of second users as candidate users, wherein second positions of the plurality of second users are distant from the first position within a preset range;
  performing a ranking on the candidate users in a descending order according to the second link value;
  when the ranking is completed, selecting a candidate user of the candidate users as the target user on the basis of the ranking; and
  creating the voice session for the target user and the first user.

Optionally, the step of selecting the second user as the target user according to the second link value to create the voice session with the first user further includes:
  when the first user and the candidate user have created a voice session before, reducing a position of the candidate user in the ranking.

Optionally, the step of updating the first link value and the second link value of the target user according to the behavior data and the second link value of the target user includes:
  mapping the behavior data to a link adjustment value;
  adjusting the second link value of the target user by using the link adjustment value to obtain a link correction value;
  adding the link correction value on the basis of the first link value to update the first link value; and
  adding the link correction value on the basis of the second link value of the target user to update the second link value of the target user.

Optionally, the step of mapping the behavior data to the link adjustment value includes:
  when the behavior data is a duration of the voice session, mapping the duration of the voice session to the link adjustment value, wherein the link adjustment value is positively correlated with the duration of the voice session.

Optionally, the step of adjusting the second link value of the target user by using the link adjustment value to obtain the link correction value includes:
  determining a number of the first user and the target user participating in the voice session;
  calculating a sum of the link adjustment value and the second link value of the target users; and
  dividing the sum by the number to obtain the link correction value.

In the second aspect, an embodiment of the present invention further provides an apparatus for matching users, including:

a matching request receiving module, configured to receive a matching request sent by a first user, wherein the first user has a first link value, and the first link value is used to indicate a value of the first user in a voice session;

a user searching module, configured to search, in response to the matching request, second users adapted to the first user, wherein each second user of the second users has a second link value used to indicate a value of the each second user in the voice session;

a user selection module, configured to select a second user of the second users as a target user according to the second link value to create a voice session with the first user;

a behavior data recording module, configured to record behavior data between the first user and the target user in the voice session; and a link value update module, configured to update the first link value and the second link value of the target user according to the behavior data and the second link value of the target user.

Optionally, the user searching module is further configured to:

read a matching condition set by the first user from the matching request; and search users as the second users, wherein the users satisfy the matching condition.

Optionally, the user selection module is further configured to:

when the first user is a new user, select the second user as the target user to create the voice session with the first user, wherein the second link value of the second user is a median;

or, when the first user is an old user, determine a first position of the first user and second positions of the second users respectively;

select a plurality of second users as candidate users, wherein second positions of the plurality of second users are distant from the first position within a preset range;

perform a ranking on the candidate users in a descending order according to the second link value;

when the ranking is completed, select a candidate user of the candidate users as the target user on the basis of the ranking; and create the voice session for the target user and the first user.

Optionally, the user selection module is further configured to:

when the first user and the candidate user have created a voice session before, reduce a position of the candidate user in the ranking.

Optionally, the link value update module is further configured to:

map the behavior data to a link adjustment value;

adjust the second link value of the target user by using the link adjustment value to obtain a link correction value;

add the link correction value on the basis of the first link value to update the first link value; and add the link correction value on the basis of the second link value of the target users to update the second link value of the target user.

Optionally, the link value update module is further configured to:

when the behavior data is a duration of the voice session, map the duration of the voice session to the link adjustment value, wherein the link adjustment value is positively correlated with the duration of the voice session.

Optionally, the link value update module is further configured to:

determine a number of the first user and the target user participating in the voice session;

calculate a sum of the link adjustment value and the second link value of the target user; and divide the sum by the number to obtain the link correction value.

In a third aspect, an embodiment of the present invention further provides computer device, the computer device including:

one or more processors; and a memory for storing one or more programs, wherein the one or more programs are configured to be, executed by the one or more processors, to implement the method for matching users according to any one of the first aspect.

In the fourth aspect, an embodiment of the present invention further provides a computer readable storage medium, the computer readable storage medium stores a computer program, and the computer program is configured to be executed by a processor, to implement the method for matching users according to any one of the first aspect.

In this embodiment, a matching request sent by a first user is received, the first user has a first link value used to indicate a value of the first user in a voice session; in response to the matching request, second users adapted to the first user are searched, each second user of the second users has a second link value used to indicate a value of the each second user in the voice session; a second user of the second user is selected as a target user according to the second link value to create a voice session with the first user; behavior data between the first user and the target user is recorded in the voice session; and the first link value and the second link value of the target user are updated according to the behavior data and the second link value of the target user; the first link value of the first user is updated on the basis of a link between the users and with reference to the performance of the voice session and the value of the target user itself, thereby dividing high-value users and low-value users; therefore, on the one hand, a lot of operators are not required for manual review, and compared to manual review, this embodiment can greatly reduce cost and improve efficiency; and on the other hand, this embodiment does not need to rely on users to willingly report other users, and can improve efficiency compared to report other users.

DETAILED DESCRIPTION OF THE EMBODIMENTS

The present invention will be further described below in detail in combination with the accompanying drawings and embodiments. Understandably, the specific embodiments described herein are merely used to explain the present invention, but not to limit the present invention. In addition, it should be noted that, for the ease of description, only the parts related to the present invention, not all structures, are shown in the accompanying drawings.

Embodiment One

Figure 1:
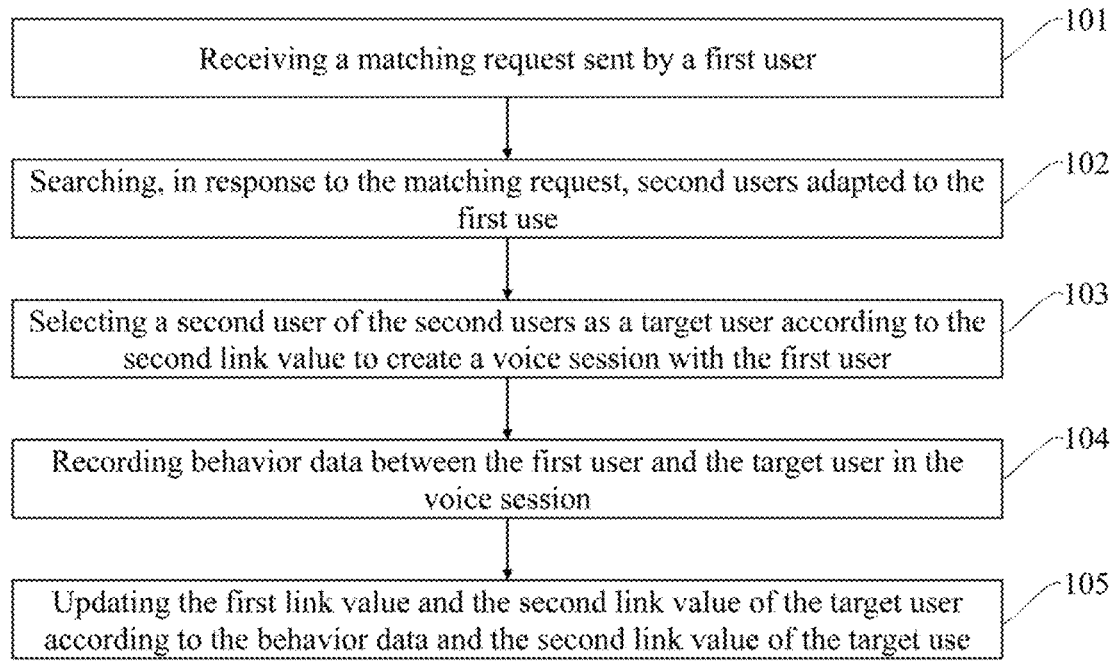
FIG. 1 is a flowchart of a method for matching users according to a first embodiment of the present invention.

FIG. 1 is a flowchart of a method for matching users according to embodiment one of the present invention. This embodiment can be adapted to adjust link values of different users according to behavior data of a voice session between the users, and is used to match different users. The method can be performed by an apparatus for matching users. The apparatus for matching users can be implemented by software and/or hardware, and can be configured in a computer device, such as a server, a workstation, or a personal computer, and the like. The method specifically includes the following step:

Step 101: receiving a matching request sent by a first user.

The computer device may serve as a social-networking platform to provide user matching and voice session services. The first user is a user registered on the social-networking platform. The first user logs in a client by means of information such as an account and a password, and the first user operates on a UI (User Interface) displayed on the client to send the matching request to the social-networking platform, i.e., requesting the social-networking platform to match other users who are not friends of the first user, thereby creating a temporary voice session.

Figure 2A:
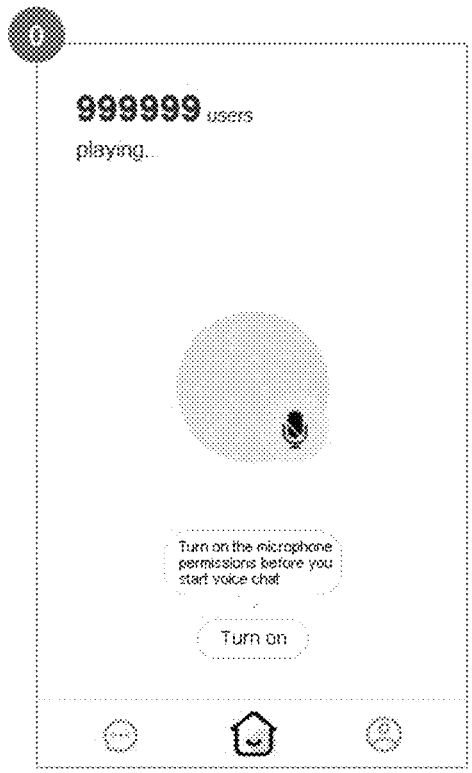
FIGS. 2A-2K are exemplary diagrams of a voice session according to the first embodiment of the present invention.
Figure 2B:
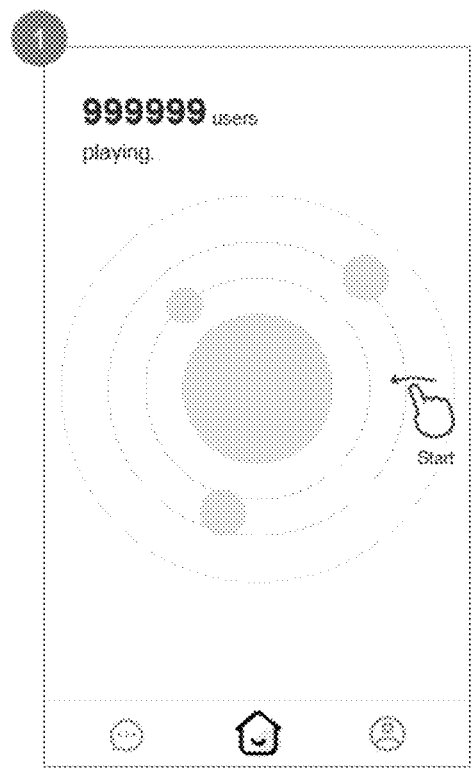
Figure 2C:
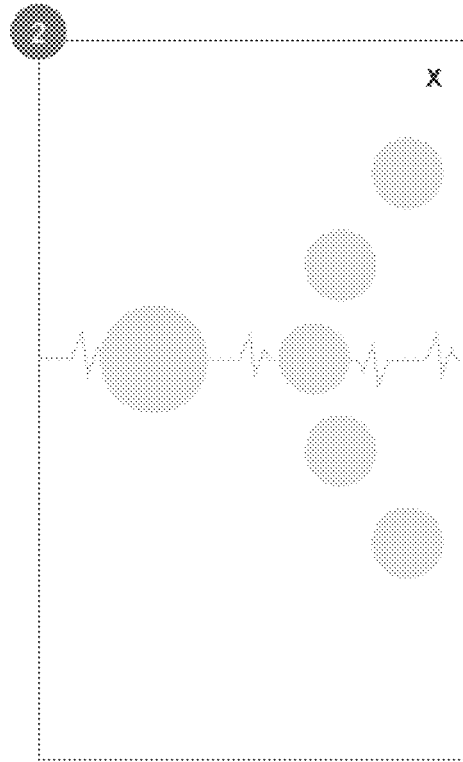

As shown in FIG. 2A, in order to perform a voice session, the client can apply the first user for the permission of a microphone; after the first user allows the client to apply for the permission of the microphone, as shown in FIG. 2B, the client displays a default home page, and the first user slides in the direction of the arrow to trigger the matching request; as shown in FIG. 2C, the client sends the matching request triggered by the first user to the social-networking platform for processing, and a matching animation is displayed locally.

In this embodiment, the first user (denoted by a user ID) has a first link value PR, and the first link value PR is used to indicate the value of the first user in the voice session, that is, the first user has the value of making friends through the voice session in a scenario of making anonymous friends, city friends or the like.

Step 102: searching, in response to the matching request, second users adapted to the first use.

The second user is a user registered on the social-networking platform. The second user logs in the client by means of information such as an account and a password, and the second user operates on the UI displayed on the client to send the matching request to the social-networking platform, i.e., requesting the social-networking platform to match other users who are not friends of the second user, thereby creating a temporary voice session.

For a user who sends a matching request, the social-networking platform can put the user into a user pool to wait for matching.

It should be noted that the first user and the second user are used to distinguish different users, any user can be the first user or the second user, and this embodiment does not limit this.

Figure 3:
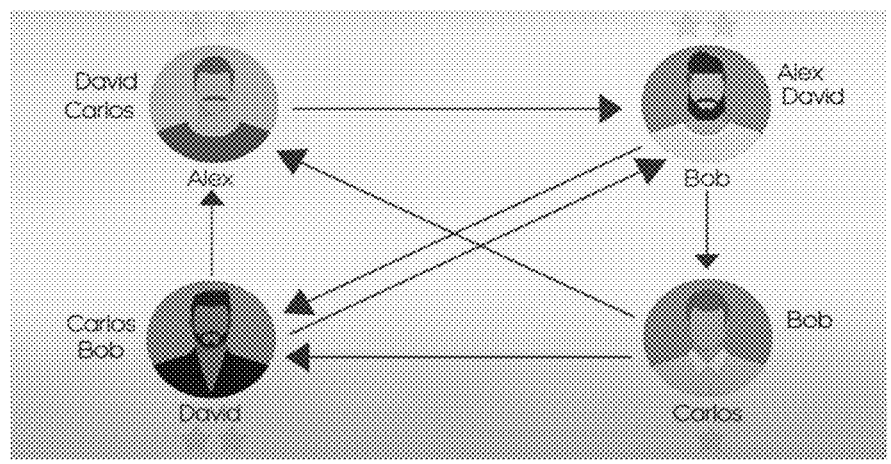
FIG. 3 is an exemplary diagram of matching users according to the first embodiment of the present invention.

For example, as shown in FIG. 3, Alex may be the first user to perform a voice session with Bob, or the second user to perform voice sessions with David and Carlos; Bob may be the first user to perform a voice session with David, or the second user to perform voice sessions with Alex and David; David may be the first user to perform voice sessions with Alex and Bob, or the second user to perform voice sessions with Carlos and Bob; and Carlos may be the first user to perform voice sessions with Alex and David, or the second user to perform a voice session with Bob.

In response to the matching request of the first user, other users adapted to the first user can be screened in the user pool as the second users.

In this embodiment, the second user (denoted by a user ID) has a second link value PR, and the second link value PR is used to indicate the value of the second user in the voice session, that is, the second user has the value of making friends through the voice session in a scenario of making anonymous friends, city friends or the like.

In a way to search the second users, the matching condition set by the first user, such as age, gender and the like, can be read from the matching request to find users who satisfy the matching condition, as the second users, for example, the matching condition set by the first user is opposite gender, then the second users of the same gender are filtered out from the user pool, and the second users of the opposite gender are found. By setting the matching condition, appropriate second users can be preliminarily screened out, which greatly reduces the number of the second users, thereby reducing the amount of calculation.

Step 103: selecting a second user of the second users as a target user according to the second link value to create a voice session with the first user.

Since the second link value PR can reflect the value of a second user in this dimension of the voice session, the second link values PR of the second users can be used as a reference to finely screen second users and screen a target user, and then a voice session is created between the first user and the target user, that is, the first user and the target user can make a session through voice.

Figure 2D:
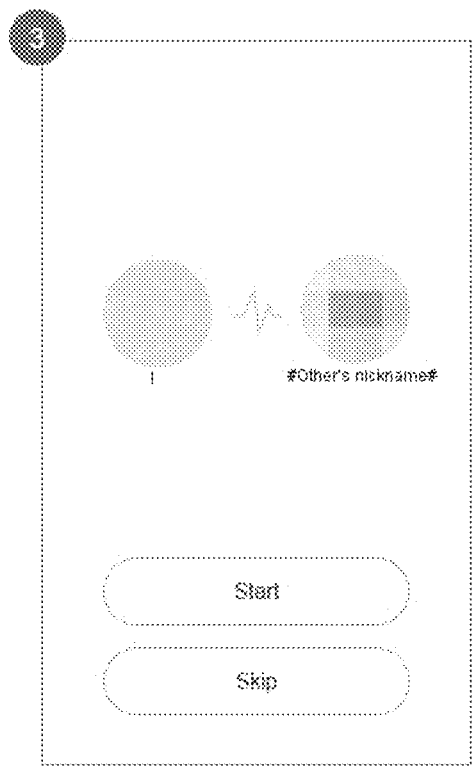

As shown in FIG. 2D, the client can display a screen of matching success. If the user clicks the control "Start" to trigger a confirmation operation, the client sends the confirmation operation to the social-networking platform, and the social-networking platform creates a voice session for the first user and the target user in response to the confirmation operation. If the user clicks the control "Skip" to trigger a skip operation, the client sends the skip operation to the social-networking platform, and the social-networking platform re-screens a target user for the first user in response to the skip operation.

Figure 2E:
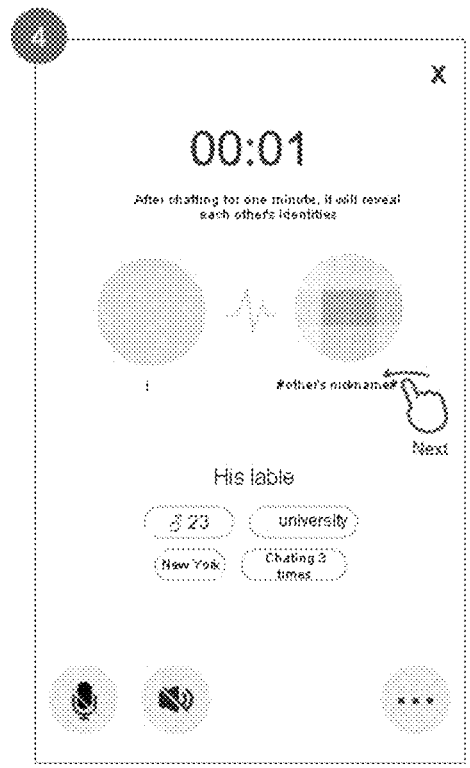

As shown in FIG. 2E, the client can fuzz the identity information (e.g., avatar) of the target users during a preset time period (e.g., 1 minute) after the first user and the target users start a voice session.

Figure 2F:
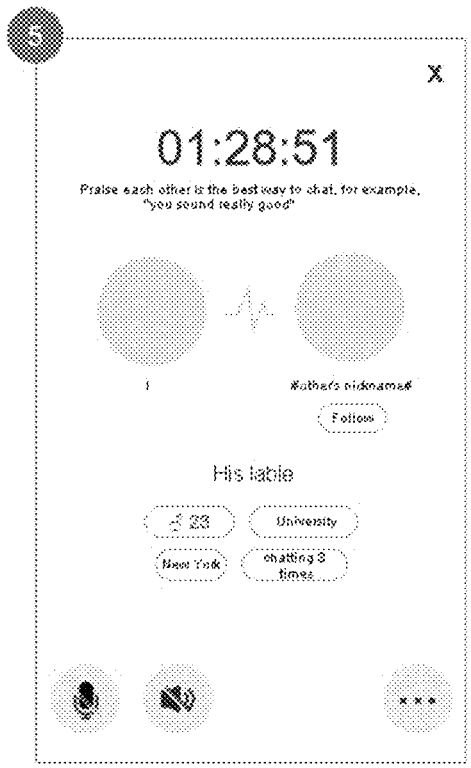

As shown in FIG. 2F, if the first user does not slide in the direction of the arrow to trigger the operation of selecting next during the preset time period, the client can display the identity information (such as avatar) of the target user.

Figure 2G:
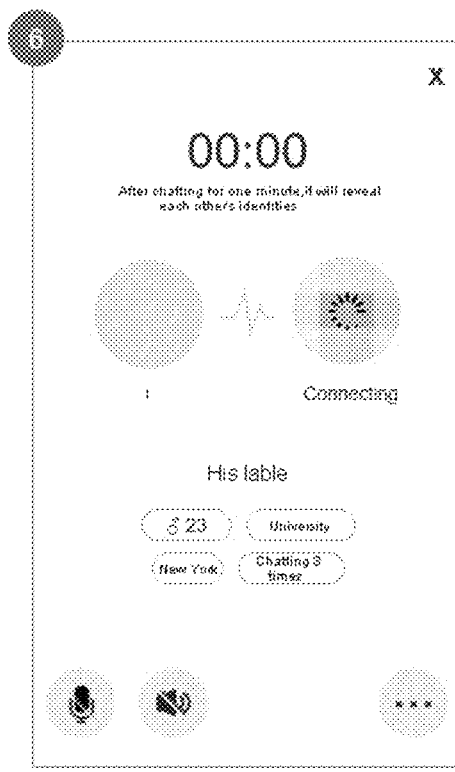

As shown in FIG. 2G, if the first user slides in the direction of the arrow to trigger the operation of selecting next during the preset time period, the client sends the operation of selecting next to the social-networking platform, and the social-networking platform ends the current voice session in response to the operation of selecting next and re-screens a target user for the first user. At this time, the client can still fuzz the identity information (e.g., avatar) of the new target user during a preset time period (e.g., 1 minute) after the first user and the new target user start a voice session.

In a case, if the first user is a new user, the second user whose second link value PR is a median can be selected as the target user to create a voice session with the first user, thereby probing the first user. The first link value PR is preliminarily defined for the first user with by the method of this embodiment.

The so called "new user" can indicate that the duration of registration of the first user is smaller than or equal to a time threshold or the number of voice sessions after registration is smaller than or equal to a number threshold, or the like, which is not limited in this embodiment.

Further, the median can be a value, or a range, which is not limited in this embodiment.

In another case, if the first user is an old user, a first position of the first user and second positions of the second users can be respectively determined.

The distances between the plurality of second positions and the first position are calculated to select the second users whose second positions are distant from the first position with a preset range, as candidate users. Preferably, the second users within the same range (such as a city) can be selected as candidate users.

The candidate users are ranked in a descending order according to the second link values PR, that is, if the second link value PR is larger, the candidate user is ranked more previously, otherwise, if the second link value PR is smaller, the candidate user is ranked more subsequently. If the ranking is completed, a candidate user is selected as the target user on the basis of the ranking. Exemplarily, the candidate user ranked first is selected as the target user, or n (n is a positive integer) candidate users ranked first are selected, and the target user is selected from the n candidate users in combination with other features (such as the frequency of the voice session) or the like, and a voice session is created accordingly for the target user and the first user.

In addition, when ranking, whether the first user and the candidate user have created a voice session before can be queried, and if the first user and the candidate user have created a voice session before, the weight of the candidate user is reduced to reduce the position of the candidate user in the ranking.

Step 104: recording behavior data between the first user and the target user in the voice session.

In this embodiment, the behavior data between the first user and the target user is recorded during the voice session of the first user and the target user.

Figure 2H:
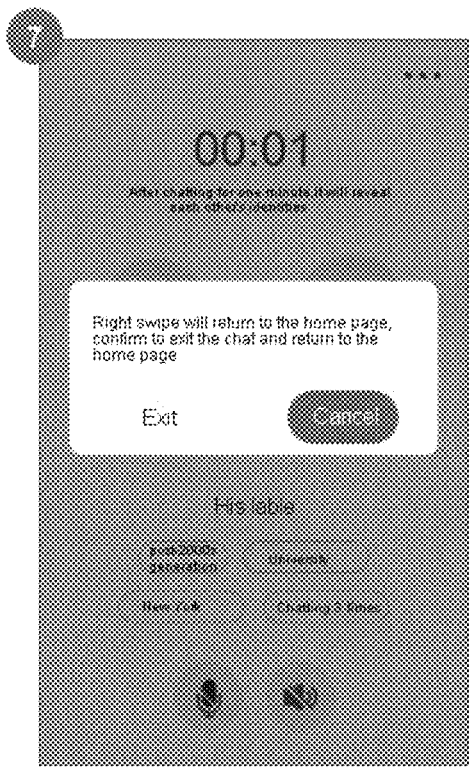
Figure 2I:
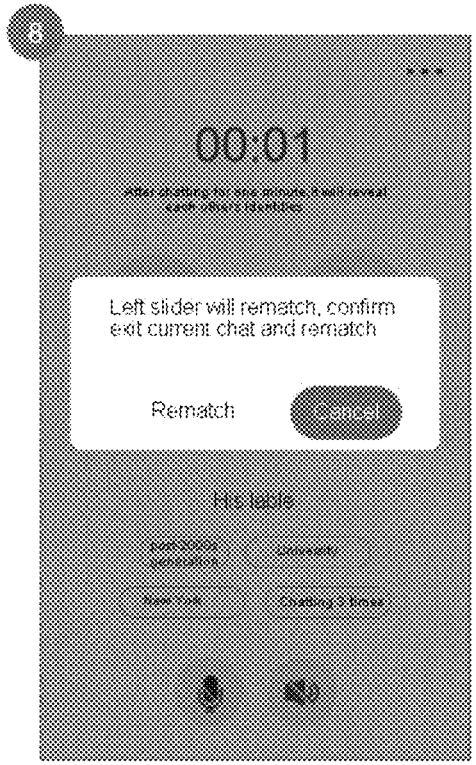
Figure 2J:
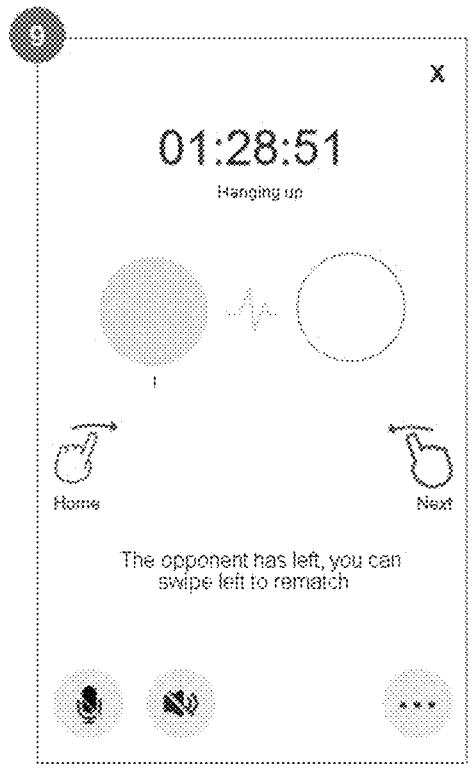

As shown in FIGS. 2H, 2I and 2J, during the voice session, the first user slides to the right in the arrow direction of "Home" to trigger an end operation, and the client exits the voice session and displays the default home page; the first user slides to the left in the arrow direction of "Next" to trigger an operation of selecting next, then the client sends the operation of selecting next to the social-networking platform, and the social-networking platform ends the current voice session in response to the operation of selecting next and re-screens a target user for the first user.

Except that the first user willingly ends the voice session, the target user can also willingly end the voice session, which is not limited in this embodiment.

Figure 2K:
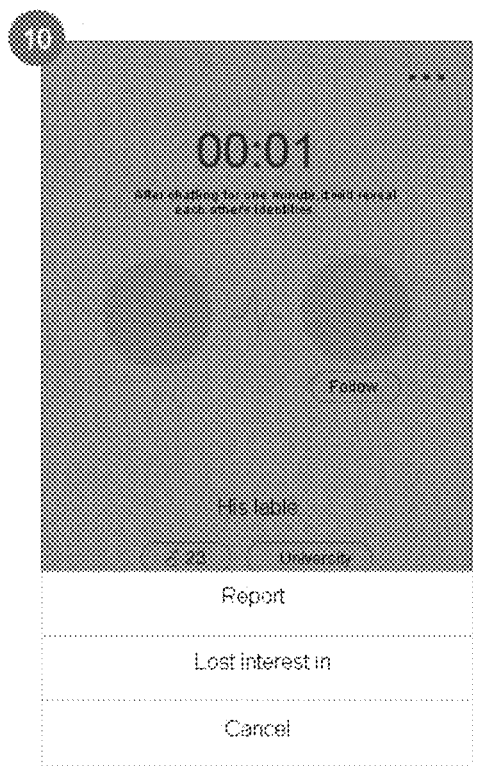

As shown in FIG. 2k, after the voice session ends, the first user can undertake more operations for the target user, for example, complaint, unconcern, and the like.

Generally, the behavior data can express the degree of recognition between the first user and a target user, such as the duration of the voice session, virtual gifts, thumb-up and the like.

Of course, the behavior data can express the degree of objection between the first user and the target user, such as the time length of exiting the voice session, throwing eggs, willingly ending the voice session, unconcern and the like, which is not limited in this embodiment.

Step 105: updating the first link value and the second link value of the target user according to the behavior data and the second link value of the target user.

Different target users have different values (i.e., second link values), and behaviors (i.e., behavior data) of different target users have different reference significances. Therefore, the first link value and the second link value of the target user can be updated by referring to the behavior data and the second link value of the target user.

Generally, for the behavior data that expresses the degree of recognition between the first user and the target user, the amplitude of updating the first link value PR and the second link value PR of the target user is positively correlated with the behavior data, that is, if the value of the behavior data is larger, the amplitude of updating the first link value PR and the second link value PR of the target user is larger; otherwise, if the value of the behavior data is smaller, the amplitude of updating the first link value PR and the second link value PR of the target user is smaller.

Further, the amplitude of updating the first link value PR and the second link value PR of the target user is positively correlated with the second link value PR of the target user, that is, if the second link value PR of the target user is larger, the amplitude of updating the first link value PR and the second link value PR of the target user is larger; otherwise, if the second link value PR of the target user is smaller, the amplitude of updating the first link value PR and the second link value PR of the target user is smaller.

In one embodiment of the present invention, step 105 includes the following steps:

Step 1051: mapping the behavior data to a link adjustment value.

In this embodiment, the behavior data can be substituted into a preset mapping function, and mapped to the link adjustment value.

For the behavior data that expresses the degree of recognition between the first user and the target user, the link adjustment value mapped is positive, and the link adjustment value is positively correlated with the behavior data, that is, if the value of the behavior data is larger, the link adjustment value is larger; otherwise, if the value of the behavior data is smaller, the link adjustment value is smaller.

Exemplarily, if the behavior data is the duration of the voice session, the duration of the voice session is mapped to the link adjustment value, wherein the link adjustment value is positively correlated with the duration of the voice session.

For example, if the duration of the voice session between the first user and the target user lasts 5 minutes, the link adjustment value scores 1; and if the duration of the voice session between the first user and the target user lasts 20 minutes, the link adjustment value scores 2.

For the behavior data that expresses the degree of objection between the first user and the target user, the link adjustment value mapped is negative, and the link adjustment value is negatively correlated with the behavior data, that is, if the value of the behavior data is larger, the link adjustment value is smaller; otherwise, if the value of the behavior data is smaller, the link adjustment value is larger.

Step 1052: adjusting the second link value of the target user by using the link adjustment value to obtain a link correction value.

In this embodiment, the link adjustment value is adjusted by increase or decrease on the basis of the second link value PR of the target user to obtain the link correction value.

Exemplarily, the number of users (i.e., the first user and the target user) participating in the voice session can be determined, the sum of the link adjustment value and the second link value PR of the target user is calculated, and the sum is divided by the number of users to obtain the link correction value.

For example, in a voice session, the number of the first user and the target user is 2, and the second link value PR of the target user is set to PR_2; if the duration of the voice session between the first user and the target user is 5 minutes, the link adjustment value scores 1, and the link correction value is (PR_2+1)/2; if the duration of the voice session between the first user and the target user is 20 minutes, the link adjustment value scores 2, and the link correction value is (PR_2+2)/2.

Step 1053: adding the link correction value on the basis of the first link value to update the first link value.

The first link value is added to the link correction value, and the sum is a new first link value, thereby implementing an update to the first link value.

Step 1054: adding the link correction value on the basis of the second link value of the target users to update the second link value of the target user.

The second link value PR of the target user is added to the link correction value, and the sum is a new second link value PR of the target user, thereby implementing an update to the second link value PR of the target user.

If a user performs better during a voice session with other users and succeeds in voice sessions with more high-value users, the first link value PR of the user is larger; otherwise, if a user performs worse during a voice session with other users and fails in voice sessions with more high-value users, the first link value PR of the user is smaller; during matching, the probability of matching high-quality users (i.e., users with larger first link values PR) is higher, and the probability of matching low-quality users (i.e., users with smaller first link values PR) is lower, thereby achieving the division of high-quality users and low-quality users.

In this embodiment, a matching request sent by a first user is received, and the first user has a first link value used to indicate the value of the first user in a voice session; in response to the matching request, second users adapted to the first user are searched, and each second user has a second link value, and the second link value is used to indicate the value of the second user in the voice session; a second user is selected as a target user according to the second link value to create a voice session with the first user; behavior data between the first user and the target user is recorded in the voice session; and the first link value and the second link value of the target user are updated according to the behavior data and the second link value of the target user; the first link value of the first user is updated on the basis of a link between the users and with reference to the performance of the voice session and the value of the target user itself, thereby dividing high-value users and low-value users; therefore, on the one hand, a lot of operators are not required for manual review, and compared to manual review, this embodiment can greatly reduce cost and improve efficiency; and on the other hand, this embodiment does not need to rely on users to willingly report other users, and can improve efficiency compared to report other users.

It should be noted that, for the sake of simple description, the method embodiment is described as a series of operations, but a person skilled in the art should note that the embodiment of the present invention is not limited by the described sequence of the operations, because some steps can be carried out in other orders or simultaneously according to the embodiment of the present invention. Second, the person skilled in the art should also note that the embodiments described in the specification are preferred embodiments, and the operations involved are not essential for the embodiments of the present invention.

Embodiment Two

Figure 4:
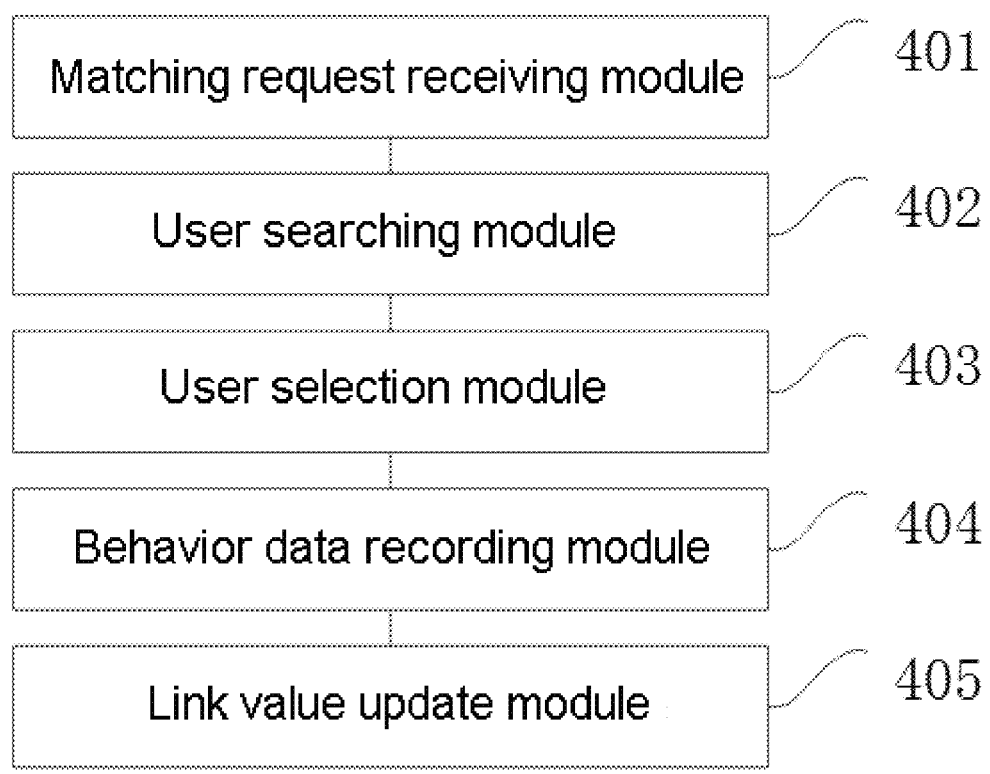
FIG. 4 is a schematic structural diagram of an apparatus for matching users according to a second embodiment of the present invention.

FIG. 4 is a structural block diagram of an apparatus for matching users according to a second embodiment of the present invention, specifically including the following modules:

a matching request receiving module 401, configured to receive a matching request sent by a first user, wherein the first user has a first link value used to indicate a value of the first user in a voice session;

a user searching module 402, configured to search, in response to the matching request, second users adapted to the first user, wherein each second user of the second users has a second link value used to indicate a value of the each second user in the voice session;

a user selection module 403, configured to select a second user of the second users as a target user according to the second link value to create a voice session with the first user;

a behavior data recording module 404, configured to record behavior data between the first user and the target user in the voice session; and a link value update module 405, configured to update the first link value and the second link value of the target user according to the behavior data and the second link value of the target user.

In one embodiment of the present invention, the user searching module 402 is further configured to:
read a matching condition set by the first user from the matching request; and
search users who satisfy the matching condition as the second users.

In one embodiment of the present invention, the user selection module 403 is further configured to:
if the first user is a new user, select the second user whose second link value is a median as the target user to create a voice session with the first user;
or,
if the first user is an old user, determine a first position of the first user and second positions of the second users respectively;
select a plurality of second users whose second positions are distant from the first position within a preset range, as candidate users;
rank the candidate users in a descending order according to the second link value;
if the ranking is completed, select a candidate user as the target user on the basis of the ranking; and
create the voice session for the target user and the first user.

In one embodiment of the present invention, the user selection module 403 is further configured to:
if the first user and the candidate user have created a voice session before, reduce the position of the candidate user in the ranking.

In one embodiment of the present invention, the link value update module 405 is further configured to:
map the behavior data to a link adjustment value;

adjust the second link value of the target user by using the link adjustment value to obtain a link correction value;

add the link correction value on the basis of the first link value to update the first link value; and add the link correction value on the basis of the second link value of the target user to update the second link value of the target user.

In one embodiment of the present invention, the link value update module 405 is further configured to:

if the behavior data is the duration of the voice session, map the duration of the voice session to the link adjustment value, wherein the link adjustment value is positively correlated with the duration of the voice session.

In one embodiment of the present invention, the link value update module 405 is further configured to:

determine the number of the first user and the target user participating in the voice session;

calculate the sum of the link adjustment value and the second link value of the target user; and divide the sum by the number to obtain the link correction value.

The apparatus for matching users according to the embodiment of the present invention can perform the method for matching users according to any embodiment of the present invention, and has corresponding functional modules and beneficial effects of the performed method.

Embodiment Three

Figure 5:
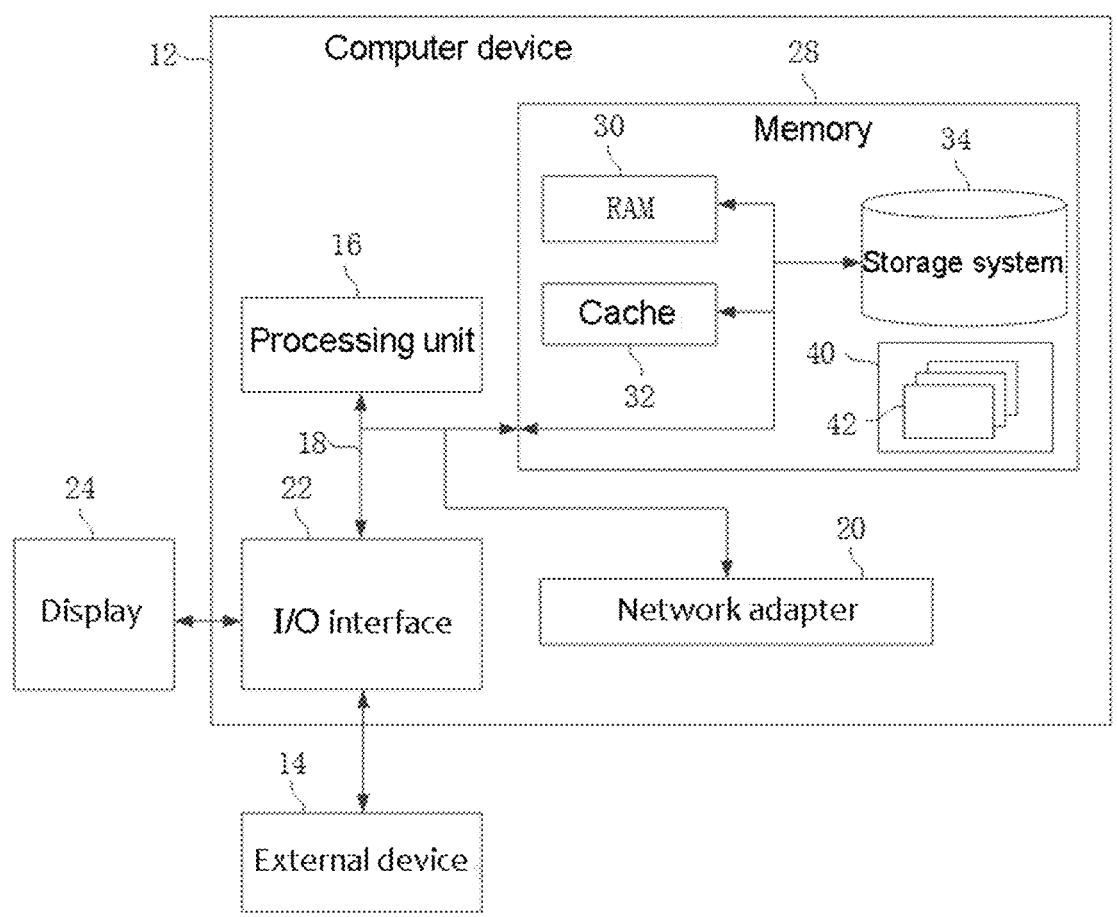
FIG. 5 is a schematic structural diagram of a computer device according to a third embodiment of the present invention.

FIG. 5 is a schematic structural diagram of a computer device according to a third embodiment of the present invention. FIG. 5 shows a block diagram of an exemplary computer device 12 suitable for implementing the embodiments of the present invention. The computer device 12 shown in FIG. 5 is merely an example, which does not impose any restrictions on the functions and scope of application of the embodiments of the present invention.

As shown in FIG. 5, the computer device 12 is manifested in the form of a general-purpose computing device. Components of the computer device 12 may include, but are not limited to, one or more processors or a processing unit 16, a system memory 28, and a bus 18 connecting different system elements (including the system memory 28 and the processing unit 16).

The bus 18 represents one or more of several types of bus structures, including a memory bus or memory controller, a peripheral bus, a graphics acceleration port, a processor, or a local area bus using any of a variety of bus structures. For example, these architecture structures include, but are not limited to, an industrial standard architecture (ISA) bus, a micro channel architecture (MAC) bus, an enhanced ISA bus, a video electronic standard association (VESA) local area bus, and a peripheral component interconnect (PCI) bus.

The computer device 12 typically includes a variety of computer system readable media. These media may be any available medium that can be accessed by the computer device 12, including volatile and non-volatile media, mobile and immobile media.

The system memory 28 may include computer system readable media in the form of volatile memories, such as a random access memory (RAM) 30 and/or a cache 32. The computer device 12 may further include other mobile/immobile, volatile/non-volatile computer system storage media. For example, a storage system 34 can be used for reading and writing immobile and non-volatile magnetic media (not shown in FIG. 5, commonly referred to as "hard drives"). Although not shown in FIG. 5, magnetic disk drives for reading and writing mobile non-volatile magnetic disks (such as "floppy disks") and optical disk drives for reading and writing mobile non-volatile optical disks (such as CD-ROM, DVD-ROM or other optical media) can be provided. In these cases, each drive can be connected to the bus 18 through one or more data media interfaces. The memory 28 may include at least one program product, and the program product has a set (for example, at least one) of program modules configured to perform the functions of the embodiments of the present invention.

A program/utility 40 having a set (at least one) of program modules 42 may be stored in the memory 28. Such program modules 42 include, but are not limited to an operating system, one or more applications, other program modules and program data. Each or a combination of these examples may include the implementation of a network environment. The program modules 42 typically perform the functions and/or methods in the embodiments described herein.

The computer device 12 may also communicate with one or more external devices 14 (e.g., a keyboard, a pointing device, a display 24, etc.), and may also communicate with one or more devices that enable a user to interact with the computer device 12, and/or communicate with any device (e.g., a network card, a modem, etc.) that enables the computer device 12 to communicate with one or more other computing devices. The communication may be performed via an input/output (I/O) interface 22. In addition, the computer device 12 may also communicate with one or more networks (e.g., a local area network (LAN), a wide area network (WAN), and/or a public network, such as the Internet) via a network adapter 20. As shown, the network adapter 20 may communicate with other modules of the computer device 12 via the bus 18. It should be understood that although not shown in figure, other hardware and/or software modules may be used with the computer device 12, including but not limited to: microcodes, a device driver, a redundant processing unit, an external disk drive array, an RAID system, a tape driver, and a data backup storage system, or the like.

The processing unit 16 performs various functional applications and data processing, for example, implements the method for matching users according to the embodiments of the present invention, by running the programs stored in the system memory 28.

Embodiment Four

The Embodiment four of the present invention further provides a computer readable storage medium. The computer readable storage medium stores a computer program. When the computer program is executed by a processor, each process of the above-mentioned method for matching users is implemented, and the same technique effects can be achieved. In order to avoid repetition, details are not described herein again.

The computer readable storage medium, for example, may include but not is limited to, systems, apparatuses or devices of electricity, magnetism, light, electromagnetism, infrared or semiconductors, or any combination of the above. More specific examples (a non-exhaustive list) of the computer readable storage medium may include: an electrical connection with one or more wires, a portable computer disk, a hard disk, a random access memory (RAM), a read-only memory (ROM), an erasable programmable read-only memory (EPROM or flash memory), a fiber, a portable compact disk read-only memory (CD-ROM), an optical memory, a magnetic memory, or any suitable combination of the above. Herein, the computer readable storage medium may be any tangible medium containing or storing programs, and the programs may be used by an instruction execution system, apparatus or devices or incorporated thereto.

It should be noted that the above only describes the preferred embodiments of the present invention and the technical principles used. It could be appreciated by those skilled in the art that the present invention is not limited to the specific embodiments described herein, and various significant changes, modifications and alternatives can be made for those skilled in the art without departing from the protection scope of the present invention. Therefore, although the present invention is described in detail by the above embodiments, the present invention is not limited to the above embodiments, more other equivalent embodiments may also be included without departing from the concept of the present invention, and the scope of the present invention is defined by the scope of the appended claims.

What is claimed is:

1. A method for matching users, comprising:
   receiving a matching request sent by a first user, wherein the first user has a first link value used to indicate a performance of the first user in making anonymous friends through voice sessions;
   searching, in response to the matching request, second users adapted to the first user, wherein each second user of the second users has a second link value used to indicate a performance of the each second user in making anonymous friends through voice sessions;
   selecting a second user of the second users as a target user according to the second link value of the each second user to create an anonymous voice session between the first user and the target user;
   recording behavior data between the first user and the target user, the behavior data being recorded from the anonymous voice session and the behavior data comprises a duration of the anonymous voice session; and
   updating the first link value of the first user and the second link value of the target user according to the behavior data and the second link value of the target user by:
      mapping the behavior data to a link adjustment value; and
      mapping the duration of the anonymous voice session to the link adjustment value, wherein the link adjustment value is positively correlated with the duration of the anonymous voice session.

2. The method according to claim 1, wherein the step of searching, in response to the matching request, the second users adapted to the first user comprises:
   reading a matching condition set by the first user from the matching request; and
   searching users as the second users, wherein the second users satisfy the matching condition.

3. The method according to claim 2, wherein the step of updating the first link value of the first user and the second link value of the target user according to the behavior data and the second link value of the target user further comprises:
   adjusting the second link value of the target user by using the link adjustment value to obtain a link correction value;
   adding the link correction value on the basis of the first link value to update the first link value; and
   adding the link correction value on the basis of the second link value of the target users to update the second link value of the target user.

4. The method according to claim 1, wherein the step of selecting the second user as the target user according to the second link value to create the anonymous voice session between the first user and the target user comprises:
   when the first user is a new user, the selecting of the second user as the target user to create the anonymous voice session with the first user is based on a median of the second link values of the second users;
   or,
   when the first user is an existing user, determining a first position of the first user and second positions of the second users respectively;
   selecting a plurality of second users as candidate users, wherein second positions of the plurality of second users are distant from the first position within a preset range;
   performing a ranking on the candidate users in a descending order according to the second link value;
   when the ranking is completed, selecting a candidate user of the candidate users as the target user on the basis of the ranking; and
   creating the anonymous voice session for the target user and the first user.

5. The method according to claim 4, wherein the step of selecting the second user as the target user according to the second link value to create the anonymous voice session between the first user and the target user further comprises:
   when the first user and the candidate user have created a voice session before, reducing a position of the candidate user in the ranking.

6. The method according to claim 5, wherein the step of updating the first link value of the first user and the second link value of the target user according to the behavior data and the second link value of the target user further comprises:
   adjusting the second link value of the target user by using the link adjustment value to obtain a link correction value;
   adding the link correction value on the basis of the first link value to update the first link value; and
   adding the link correction value on the basis of the second link value of the target users to update the second link value of the target user.

7. The method according to claim 4, wherein the step of updating the first link value of the first user and the second link value of the target user according to the behavior data and the second link value of the target user further comprises:
   adjusting the second link value of the target user by using the link adjustment value to obtain a link correction value;
   adding the link correction value on the basis of the first link value to update the first link value; and
   adding the link correction value on the basis of the second link value of the target users to update the second link value of the target user.

8. The method according to claim 1, wherein the step of updating the first link value of the first user and the second link value of the target user according to the behavior data and the second link value of the target user further comprises:
   adjusting the second link value of the target user by using the link adjustment value to obtain a link correction value;

adding the link correction value on the basis of the first link value to update the first link value; and adding the link correction value on the basis of the second link value of the target users to update the second link value of the target user.

9. The method according to claim 8, wherein the step of adjusting the second link value of the target user by using the link adjustment value to obtain the link correction value comprises:

determining a number of the first user and the target user participating in the anonymous voice session;

calculating a sum of the link adjustment value and the second link value of the target user; and dividing the sum by the number to obtain the link correction value.

10. An apparatus for matching users, comprising:

a matching request receiving module, configured to receive a matching request sent by a first user, wherein the first user has a first link value used to indicate a performance of the first user in making anonymous friends through voice sessions;

a user searching module, configured to search, in response to the matching request, second users adapted to the first user, wherein each second user of the second users has a second link value used to indicate a performance of the each second user in making anonymous friends through voice sessions;

a user selection module, configured to select a second user of the second users as a target user according to the second link value of the each second user to create an anonymous voice session between the first user and the target user;

a behavior data recording module, configured to record behavior data between the first user and the target user, the behavior data being recorded from the anonymous voice session and the behavior data comprises a duration of the anonymous voice session; and a link value update module, configured to update the first link value of the first user and the second link value of the target user according to the behavior data and the second link value of the target user by:

mapping the behavior data to a link adjustment value; and mapping the duration of the anonymous voice session to the link adjustment value, wherein the link adjustment value is positively correlated with the duration of the anonymous voice session.

11. A computer device, comprising:

one or more processors, and a memory for storing one or more programs;

wherein the one or more programs are configured to be executed by the one or more processors to implement the method for matching users according to claim 1.

12. The computer device according to claim 11, wherein the step of searching, in response to the matching request, the second users adapted to the first user comprises:

reading a matching condition set by the first user from the matching request; and searching users as the second users, wherein the second users satisfy the matching condition.

13. The computer device according to claim 11, wherein the step of selecting the second user as the target user according to the second link value to create the anonymous voice session between the first user and the target user comprises:

when the first user is a new user, the selecting of the second user as the target user to create the anonymous voice session with the first user is based on a median of the second link values of the second users;

or, when the first user is an existing user, determining a first position of the first user and second positions of the second users respectively;

selecting a plurality of second users as candidate users, wherein second positions of the plurality of second users are distant from the first position within a preset range;

performing a ranking on the candidate users in a descending order according to the second link value;

when the ranking is completed, selecting a candidate user of the candidate users as the target user on the basis of the ranking; and creating the anonymous voice session for the target user and the first user.

14. The computer device according to claim 13, wherein the step of selecting the second user as the target user according to the second link value to create the anonymous voice session between the first user and the target user further comprises:

when the first user and the candidate user have created a voice session before, reducing a position of the candidate user in the ranking.

15. The computer device according to claim 9, wherein the step of updating the first link value of the first user and the second link value of the target user according to the behavior data and the second link value of the target user further comprises:

adjusting the second link value of the target user by using the link adjustment value to obtain a link correction value;

adding the link correction value on the basis of the first link value to update the first link value; and adding the link correction value on the basis of the second link value of the target users to update the second link value of the target user.

16. The computer device according to claim 15, wherein the step of adjusting the second link value of the target user by using the link adjustment value to obtain the link correction value comprises:

determining a number of the first user and the target user participating in the anonymous voice session;

calculating a sum of the link adjustment value and the second link value of the target user; and dividing the sum by the number to obtain the link correction value.

17. A non-transitory computer readable storage medium, wherein the non-transitory computer readable storage medium stores a computer program, and the computer program is configured to be executed by a processor to implement the method for matching users according to claim 1.

18. The computer readable storage medium according to claim 17, wherein the step of searching, in response to the matching request, the second users adapted to the first user comprises:

reading a matching condition set by the first user from the matching request; and searching users as the second users, wherein the second users satisfy the matching condition.

* * * * *